United States Patent

Okamoto et al.

[11] Patent Number: 5,872,991
[45] Date of Patent: Feb. 16, 1999

[54] DATA DRIVEN INFORMATION PROCESSOR FOR PROCESSING DATA PACKET INCLUDING COMMON IDENTIFICATION INFORMATION AND PLURALITY OF PIECES OF DATA

[75] Inventors: Toshiya Okamoto, Kyoto; Tsuyoshi Muramatsu, Nara, both of Japan

[73] Assignee: Sharp, Kabushiki, Kaisha, Osaka, Japan

[21] Appl. No.: 720,965

[22] Filed: Oct. 10, 1996

[30] Foreign Application Priority Data

Oct. 18, 1995 [JP] Japan .................................. 7-269573

[51] Int. Cl.$^6$ .................................................. G06F 15/82
[52] U.S. Cl. ................................ 395/800.26; 395/800.18; 395/800.25; 395/800.27; 395/855; 370/300; 370/351; 371/37.02
[58] Field of Search ..................... 395/800.18, 800.25, 395/800.26, 800.27, 855; 370/300, 351; 371/37.02

[56] References Cited

U.S. PATENT DOCUMENTS

| | | | |
|---|---|---|---|
| 5,072,377 | 12/1991 | Asai et al. | 711/216 |
| 5,115,510 | 5/1992 | Okamoto | 395/800.26 |
| 5,125,097 | 6/1992 | Okamoto et al. | 395/800.25 |
| 5,241,683 | 8/1993 | Okamoto | 395/800.26 |
| 5,327,569 | 7/1994 | Shima et al. | 395/800.26 |
| 5,404,558 | 4/1995 | Okamoto | 395/800.27 |
| 5,448,745 | 9/1995 | Okamoto | 395/800.25 |
| 5,452,464 | 9/1995 | Nomura et al. | 395/377 |
| 5,454,115 | 9/1995 | Okamoto | 395/800.25 |
| 5,483,657 | 1/1996 | Hatakeyama | 395/800.27 |
| 5,483,661 | 1/1996 | Yoshida et al. | 395/800.26 |
| 5,497,344 | 3/1996 | Okamoto | 395/800.26 |
| 5,502,720 | 3/1996 | Muramatsu | 370/412 |
| 5,511,215 | 4/1996 | Terasaka et al. | 395/800.25 |
| 5,524,112 | 6/1996 | Azuma et al. | 370/402 |
| 5,577,256 | 11/1996 | Muramatsu et al. | 395/800.27 |
| 5,586,281 | 12/1996 | Miyama et al. | 395/800.27 |
| 5,590,355 | 12/1996 | Shichiku et al. | 395/800.26 |
| 5,630,151 | 5/1997 | Muramatsu et al. | 395/377 |
| 5,652,906 | 7/1997 | Kadosumi et al. | 395/800.26 |

FOREIGN PATENT DOCUMENTS 5 35894   2/1993   Japan .

OTHER PUBLICATIONS

An evaluation of Parallel–Processing in the Dynamic Data–Driven Processors, Hiroshi Kanekura et al., IC Development Center, IC Group, Sharp Corp., pp. 1–17.

*Primary Examiner*—Daniel H. Pan
*Assistant Examiner*—Nabil El-Hady

[57] ABSTRACT

A data driven information processor includes an input control portion for producing a first data packet including common identification information and a plurality of pieces of data, a junction portion for controlling input of the first data packet and a second data packet, a firing control portion for detecting data to be paired with data in the selected data packet and outputting paired data, an operation processing portion for operating the paired data, a program storage portion for producing and outputting a second data packet based on a result of operation, and a branching portion for controlling whether to output the second data packet to the junction portion or to another data driven information processor. A plurality of such data driven information processors are connected for parallel processing.

26 Claims, 9 Drawing Sheets

$\begin{cases} D1' = 5 & D1 = 1 \\ D0' = 1 & D0 = 6 \end{cases}$

D1" = CONDITION ESTABLISHED, BC = 1
D0" = CONDITION NOT ESTABLISHED, BC = 0

F = 2-GENERATION-PACKETTING
VALID/INVALID FLAG

DATA DRIVEN INFORMATION PROCESSOR FOR PROCESSING DATA PACKET INCLUDING COMMON IDENTIFICATION INFORMATION AND PLURALITY OF PIECES OF DATA

BACKGROUND OF THE INVENTION

1. Field of the Invention

The present invention relates generally to data driven information processors executing parallel processing and more particularly to a data driven information processor for processing a data packet including a plurality of pieces of data.

2. Description of the Related Art

In recent years, in various fields including high resolution image processing and various simulations, there is an increased demand for the improvement of processor performances. Increase in the operation speed of devices achieved by today's LSI (Large Scale Integration) manufacturing techniques however has its limit. Parallel processing calls much attention instead, and processings based on the data driven method are much studied and developed.

FIG. 1A is a block diagram showing the configuration of a conventional data driven information processing device (hereinafter referred to as data driven processor).

FIG. 1B is a diagram showing the structure of a data packet processed by the conventional data driven processor.

A data packet 110 includes instruction information 106, destination information (node number) 107, a generation number 108, and one piece of data 109. Instruction information 106 indicates the kind of an instruction to be processed by the data driven processor, in other words indicates information for identifying an operation to be executed on data 109. Destination information (node number) 107 indicates a node number in a program, and determines which data driven processor the data packet is input to. Generation number 108 is information for identifying a plurality of data pairs, and different numbers are given to different data pairs. The data pair corresponds to the operand of an instruction, and data 109 in data packet 110 corresponds to one of the data pair. If, therefore, the instruction has two operands, there are two data packets including the same destination information 107 and the same generation number 108. The generation number 108 is not necessary for the static data driven method which tolerates only one data pair in a processing, but the generation number will be necessary for a dynamic data driven method which tolerates two or more data pairs.

A junction portion 101 refers to destination information 107 in data packet 110 and determines whether or not data packet 110 should be processed in the data driven processor. Junction portion 101 receives data packet 110 as an input and outputs the packet to a firing control portion 102 if it determines that data packet 110 should be processed in the data driven processor.

Firing control portion 102 determines whether or not data to be operated with data 109 in the input data packet 110 (data 109 in another data packet 110 including the same destination information 107 and the same generation number 108) is already present in a queuing memory which is not shown. If such data to be operated with data 109 in the input data packet 110 is present in the queuing memory, firing control portion 102 outputs these pieces of data (data pair) to a function processor portion 103. If no such data to be operated with data 109 in the input data packet 110 is present in the queuing memory, firing control portion 102 stores data 109 in the queuing memory for queuing.

Function processor portion 103 refers to instruction information 106, executes an operation such as multiplication and addition on the input data pair, and outputs the operation result to a program storage portion 104.

Program storage portion 104 receives the operation result, produces a data packet 110 having its information replaced with destination information (node number) 107 and instruction information 106 necessary for fetching a next instruction and outputs the packet to a branching portion 105.

Branching portion 105 refers to destination information 107 in data packet 110 output from program storage portion 104, and outputs data packet 110 to junction portion 101 based on the determination that the packet should be processed within the data driven processor, and outputs data packet 110 to another data driven processor if the packet should not be processed within the data driven processor.

The conventional data driven processor described above is presented by Kanekura et al., in Microcomputer Architecture Symposium, November, 1991, as "An Evaluation of Parallel-Processing in the Dynamic Data-Driven Processors" pp.9–17.

Data packet 110 processed in the conventional data driven processor includes only one piece of data, and cannot include a plurality of pieces of data. A data driven processor described in Japanese Patent Laying-Open No. 5-233854 including a plurality of data pair detection portions, a plurality of program storage portions, and a plurality of operation processing portions executes processing of a data packet including a plurality of pieces of instruction information, a plurality of pieces of destination information, a plurality of generation numbers and a plurality of pieces of data. The data packet including a plurality of pieces of data is therefore formed simply by combining a plurality of data packets into a single data packet.

SUMMARY OF THE INVENTION

It is an object of the invention to provide a data driven information processor with reduced data redundancy and higher data processing efficiency by accommodating a plurality of pieces of data in a data packet including common identification information.

According to an aspect of the invention, the data driven information processor includes an input control portion for producing a first data packet including common identification information and a plurality of pieces of data, a junction portion for controlling input of the first data packet and a second data packet, a firing control portion for detecting data to be paired with data in a data packet selected by the junction portion and outputting a data pair, an operation processing portion for operating the data pair, a program storage portion for producing the second data packet based on the result of operation and outputting a produced data packet, and a branching portion for controlling whether to output the second data packet to the junction portion or another data driven information processor. A plurality of such data driven information processors are connected for parallel processing.

The input control portion receives data from another data driven information processor as an input accommodating a plurality of pieces of input data in a data packet including common identification information. The data packet including the plurality of pieces of data is input to the firing control portion through the junction portion. The firing control portion determines whether or not data to be paired is queuing for each of the plurality of pieces of data included in the data packet. If such data to be paired is queuing, the firing control portion outputs corresponding pieces of data to the operation processing portion as a data pair. If no such data to be paired is queuing, the firing control portion queues until such data to be paired is input.

The operation processing portion executes an operation on the data pair input from the firing control portion, and outputs the result of operation to the program storage portion. The program storage portion produces a data packet by replacing the identification information necessary for fetching the next instruction with another, based on the result of operation and outputs the resultant data packet to the branching portion. Branching portion determines whether or not to process the input data packet within the data driven information processor. If it is determined that the data packet should be processed in the data driven information processor, the branching portion outputs the data packet to the junction portion. If it is determined that the data packet should be processed in another data driven information processor the branching portion outputs the data packet to another data driven information processor.

Therefore, according to the present invention, a plurality of pieces of data are accommodated in a data packet including common identification information, and a data driven information processor with reduced data redundancy and increased data processing efficiency may be provided.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1A:
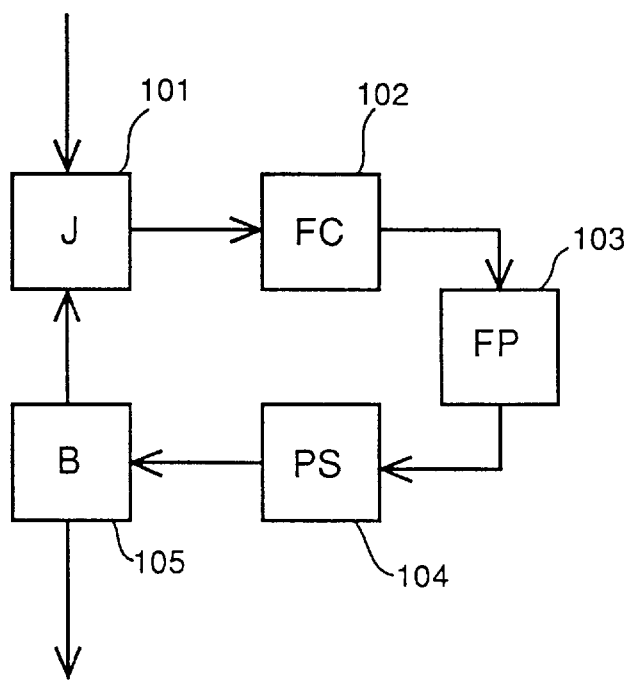
FIG. 1A is a block diagram showing the configuration of a conventional data driven processor.

The exemplary embodiments of the invention claimed in the appended claims may be more fully appreciated by reference to the following description of preferred embodiments. Within the drawing figures, it should be understood that like elements are identified by like reference numbers.

Figure 2A:
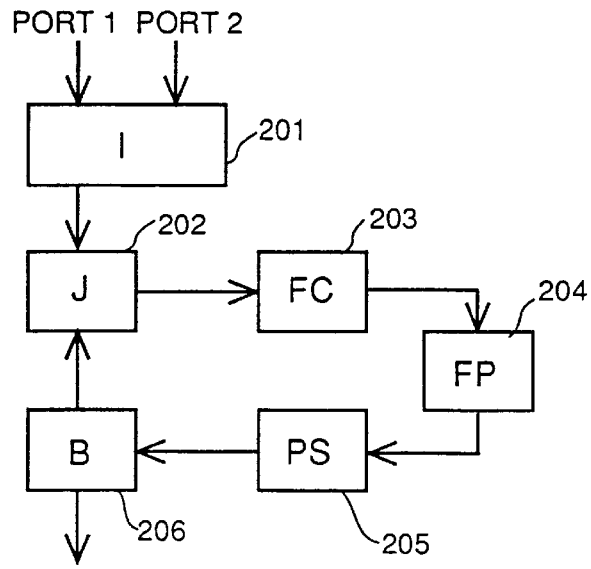
FIG. 2A is a block diagram showing the configuration of a data driven processor according to the present invention.

FIG. 2A is a block diagram showing the configuration of a data driven processor according to the present invention.

An input control portion 201 includes a plurality of input ports 1 to N connected with external data driven processors. If the number of input ports is physically 1, data is serially input N times. If the number of input ports is physically N, N pieces of data may be input in parallel at a time, and M pieces of data 1 are for example input in some cases until the N pieces of data are all input. A buffer for storing at least M×N pieces of data should be prepared in input control portion 201. Input control portion 201 accommodates these N pieces of data in a data packet including predetermined identification information once the N pieces of data are all input.

Figure 2B:
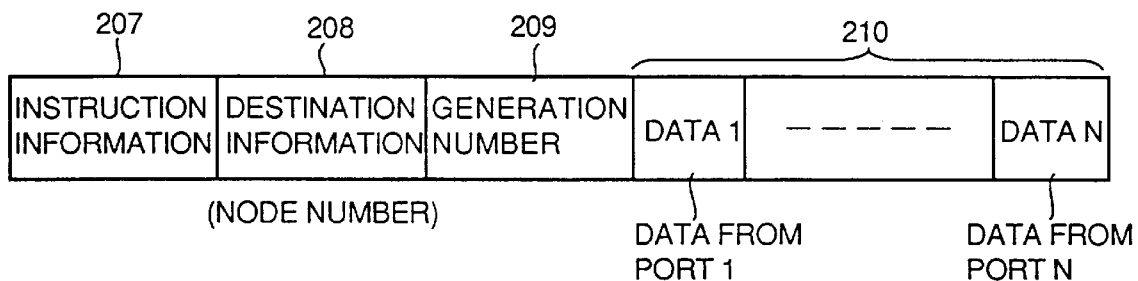
FIG. 2B is a diagram showing the arrangement of a data packet processed by the data driven processor according to the present invention by way of example.

FIG. 2B shows a data packet produced by input control portion 201. Instruction information 207 indicates the kind of operation to be executed on each of the above-described N pieces of data (data 1 to N) 210. Destination information (node number) 208 indicates a node number in a program. Generation number 209 is common between N pieces of data 210, and updated every time one data packet is produced.

Data driven processors are often used in an image signal processing system and perform the same operation to a plurality of pieces of data (image data). The plurality of pieces of data (N pieces of data) 210 may be attached with the same instruction information 207, the same destination information 208 and the same generation number 209 and accommodated into one data packet.

Junction portion 202 controls input of a data packet output from input control portion 201 and a data packet output from branching portion 206, and outputs these data packets to firing control portion 203 in a certain order to avoid a conflict.

Firing control portion 203 determines whether or not data to be operated is already in a queuing memory (not shown)

for each piece of data (one or more) in an input data packet. If the queuing memory has data to be operated with the data in the input data packet, firing control portion 203 outputs these pieces of data (data pair) to function processor portion 204. If the queuing memory does not have such data to be operated with the data in the input data packet, firing control portion 203 stores the data in the queuing memory for queuing. Firing control portion 203 will be detailed later.

Function processor portion 204 executes an operation such as multiplication and addition on the input data pair by referring to instruction information 207 and outputs the result of operation to program storage portion 205.

Program storage portion 205 produces a data packet by replacing the destination information and instruction information of the input data packet with destination information (node number) 208 and instruction information 207 necessary for fetching the next instruction based on the result of operation and outputs the resultant data packet to branching portion 206.

Branching portion 206 refers to destination information 208 in the data packet output from program storage portion 205, outputs the data packet to junction portion 202 if it determines that the data packet should be processed within the data driven processor, and outputs the data packet to another data driven processor if it determines that the data packet should not be processed in the data driven processor.

Therefore, time required for transferring data is reduced by accommodating a plurality of pieces of data in one data packet.

Figure 3:
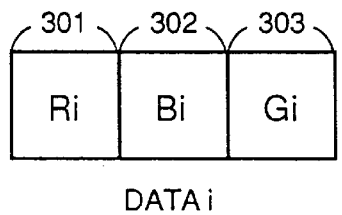
FIG. 3 is a diagram showing a data packet including image data, RGB.

FIG. 3 shows a data packet including image data as an example of a data packet including a plurality of pieces of data as described above. Note however that instruction information 207, destination information (node number) 208 and generation number 209 are not shown. Pixels in a full color image are usually represented by RGB signals. The image data of a pixel i may be represented by Ri, Bi, Gi (Ri: red signal for pixel i, Bi: blue signal for pixel i, Gi: green signal for pixel i).

When the image data is operated, the same operation is executed on each of Ri, Bi and Gi of pixel i, and therefore the image data may be incorporated into one data packet.

Figure 4:
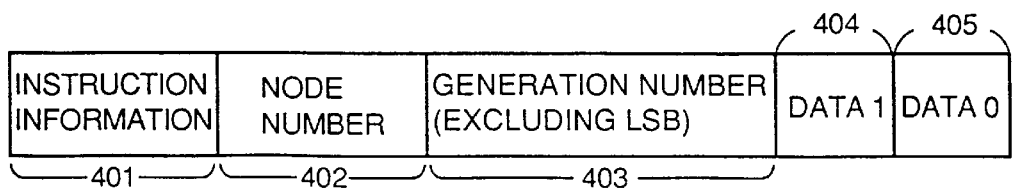
FIG. 4 is a diagram showing a data packet including two pieces of data having consecutive generation numbers.

FIG. 4 is a diagram showing a data packet including two pieces of data having consecutive generation numbers. The plurality of pieces of data having consecutive generation numbers and the same node number (destination information) 402 may be incorporated into the same data packet. If, for example, the two pieces of data have the same node number and consecutive generation numbers, only the LSB bits of the generation numbers are different, a data packet including generation number 403 removed of LSB may have data 1 404 and data 0 405. The generation numbers of these pieces of data may be recovered from their positional relation. In the same manner, data in a plurality of data packet including the same node number 402 may be accommodated into the same data packet, which is effective in a multi-generation data configuration which will be described later.

According to this method, two data packets having identification information different only by 1 bit may be accommodated into one data packet.

Figure 5:
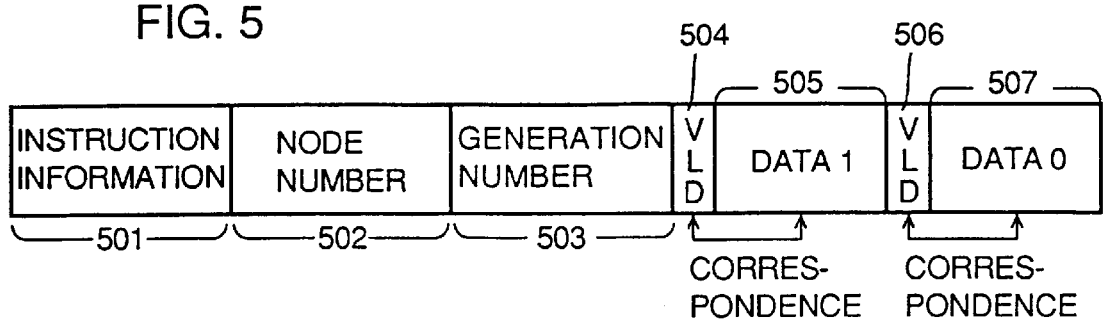
FIG. 5 is a diagram showing a data packet including data with an identifier.

FIG. 5 is a diagram showing a data packet including data attached with identifiers. Instruction information 501, node number 502, and generation number 503 are similar to instruction information 401, node number 402 and generation number 403 in FIG. 4. Data 1 505, data 0 507 are attached with VLD (VALID) flags 504 and 506, respectively.

The VLD flag indicates if corresponding data is valid or invalid, where for VLD=1 corresponding data is valid and for VLD=0 corresponding data is invalid. If the VLD flag is 0, there is no data corresponding to generation number 503 or such data is present in another data packet. By attaching the VLD flag to each data, processing may be validated, if, for example, only data 1 505 or data 0 507 in the data packet is valid. In other words, data management is facilitated.

Figure 6:
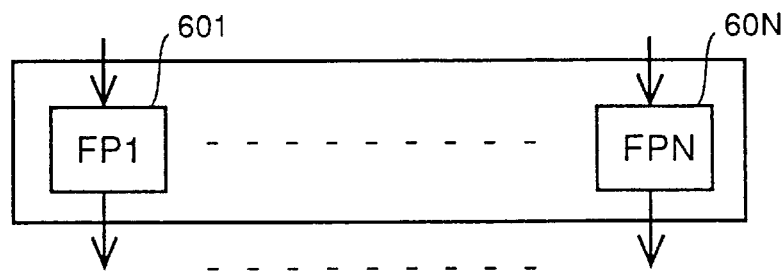
FIG. 6 is a diagram showing a function processor including a plurality of operators.

FIG. 6 shows the case in which a plurality of operators are present in function processor portion 204. Operators FP1 601 to FPN 60N correspond to a plurality of pieces of data 210 in the data packet shown in FIG. 2B, and permit operation on N pieces of data at a time. A data bus between firing control portion 203 and function processor portion 204 is as wide as one piece of data. The data is serially transferred N times. If the data bus is as wide as N pieces of data, N pieces are transferred in parallel at a time.

Since operation on the N pieces of data may be executed at a time, the speed of processing in the data driven processor is increased.

Figure 7A:
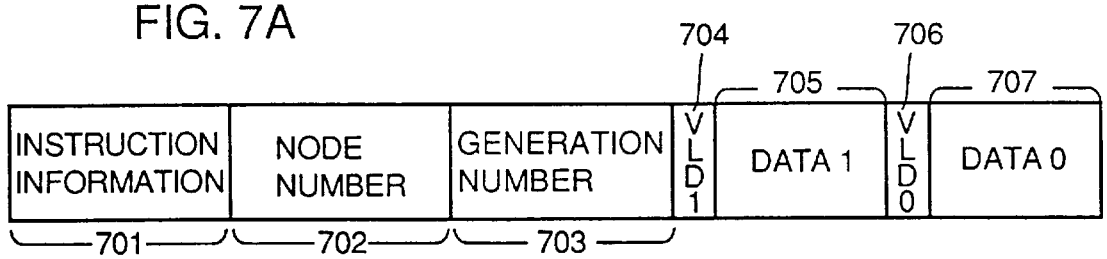
FIG. 7A is a diagram showing a data packet input to a firing control portion.
Figure 7B:
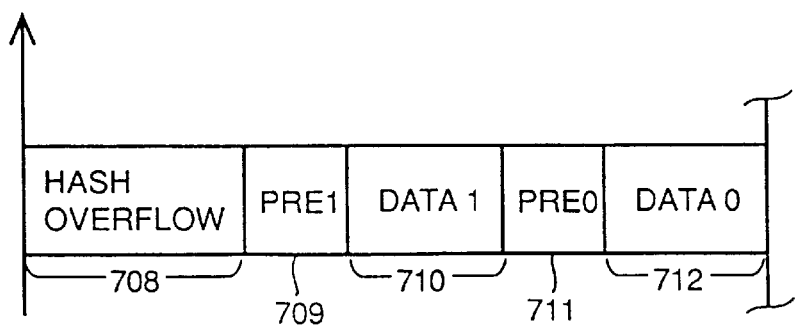
FIG. 7B is a diagram showing data within a queuing memory when there is a hash overflow.

FIG. 7A is a diagram showing a data packet input to firing control portion 203. Instruction information 701, node number 702, and generation number 703 are similar to instruction information 401, node number 402, and generation number 403 in FIG. 4, respectively. FIG. 7B is a diagram showing data in the queuing memory when firing control portion 203 stores the data packet shown in FIG. 7A in the queuing memory and there is a hash overflow. Firing control portion 203 stores the data based on a hash address of node number 702 and generation number 703 when it stores data in the data packet shown in FIG. 7A in the queuing memory for queuing. If the capacity of queuing memory is small, however, a hash address should be produced excluding part of information of node number 702 and generation number 703. The excluded partial information is stored in the queuing memory as a hash overflow 708 and then flag PRE (presence) 1 709 corresponding to data 1, data 1 710, flag PRE 0 711 corresponding to data 0, and data 0 712 follow. Flags PRE 1 709 and PRE 0 711 both indicate whether nor not corresponding data is present. For PRE=1, corresponding data is present, while for PRE=0 there is no such corresponding data.

Figure 8:
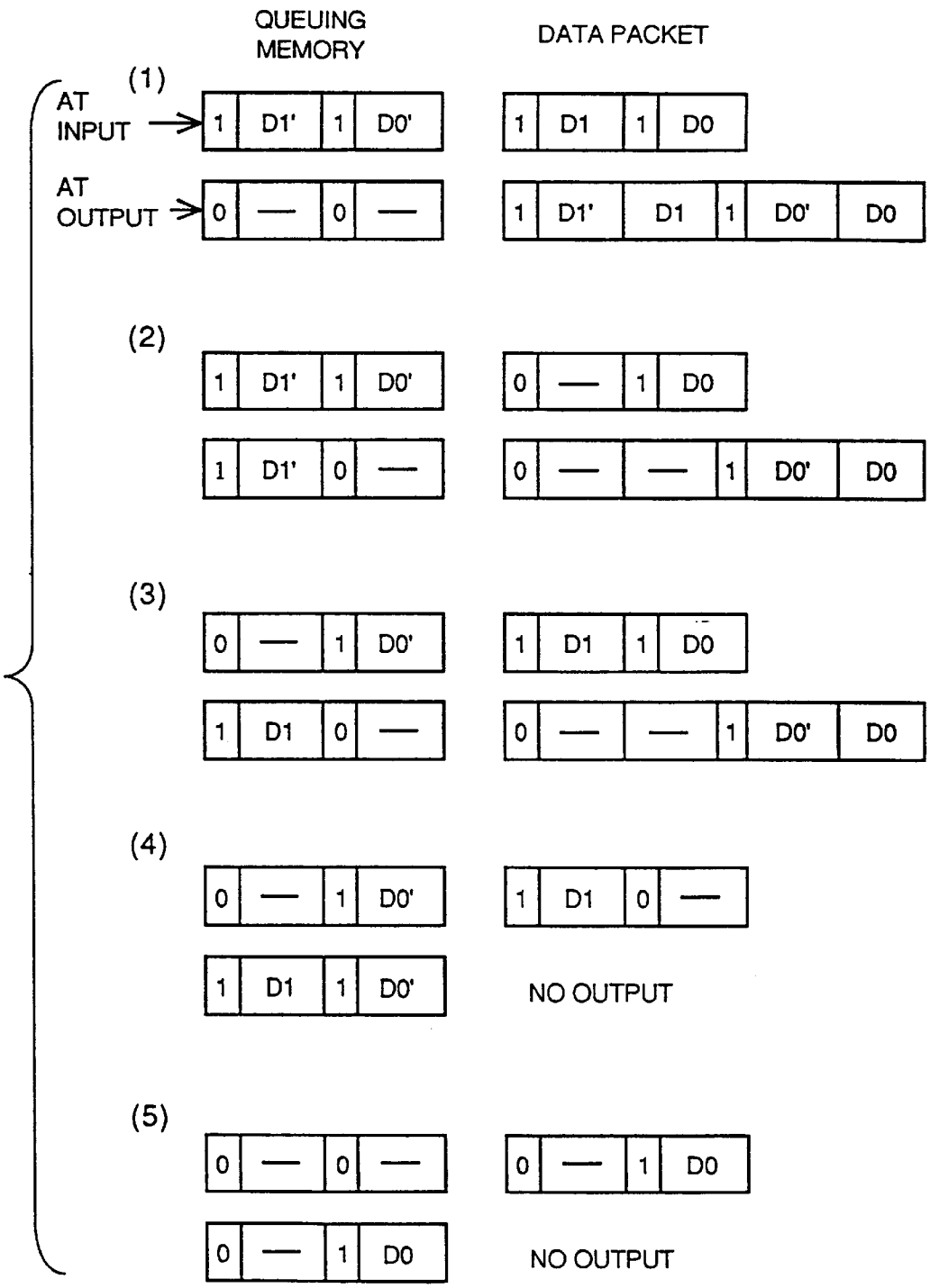
FIG. 8 is a diagram showing data in the queuing memory and input/output data packets.

FIG. 8 is a diagram showing data in the queuing memory and a packet input/output to/from the queuing memory. The states shown in FIG. 8 are as follows.

① Data D1' and D0' are present in the region of a hash address in the queuing memory, and a data packet including D1 and D0 is input to firing control portion 203. Note that the data stored in the queuing memory is shown removed of hash overflow and the data packet is shown with each identification information omitted. If the hash address in which D1' and D0' are stored and the hash overflow in the queuing memory coincide with a hash address and a hash overflow produced from the identification information of an input data packet, data D1' and D1 are paired, data D0' and D0 are paired, and therefore firing control portion 203 newly accommodates the set of D1' and D1 and its flag VLD1=1 and the set of D0' and D0 and its flag VLD 0=1 in one data packet for output. Nothing is left in the queuing memory as a result.

② Data D1' and D0' are present in the region of a hash address in the queuing memory, and a data packet including only D0 is input to firing control portion 203. If their hash addresses and hash overflows coincide, only data D0' and D0 are paired, and therefore, firing control portion 203 newly accommodates the set of D0' and D0 and the flags VLD0=1 and VLD1=0 into one data packet for output. Only D1' is left in the queuing memory.

③ Only data D0' is present in the region of a hash address in the queuing memory, a data packet including D1 and D0 is input to firing control portion 203. If their hash addresses and hash overflows coincide, only data D0' and D0 are paired, and therefore firing control portion 203 newly accommodates the set of D0' and D0 and their flags VLD0=1 and VLD1=0 into one data packet for output. D1 is stored in the queuing memory, and "1" is stored in flag PRE1 corresponding to D1.

④ Only data D0' is present in the region of a hash address in the queuing memory, and a data packet including only D1 is input to firing control portion 203. If their hash addresses and hash overflows coincide, since there is no data to be paired, firing control portion 203 will not output a data packet, thus stores D1 in the queuing memory, and "1" is stored in flag PRE1 corresponding to D1.

⑤ No data is present in the region of a hash address in the queuing memory, and a data packet including only D0 is input to firing control portion 203. If their hash addresses and the hash overflows coincide, since there is no data to be paired, firing control portion 203 will not output a data packet, stores D0 in the queuing memory and "1" is stored in flag PRE0 corresponding to D0.

By the above processing, a data packet having only one piece of data and a data packet having a plurality of pieces of data may queue in the queuing memory without conflict with each other.

Figure 9A:
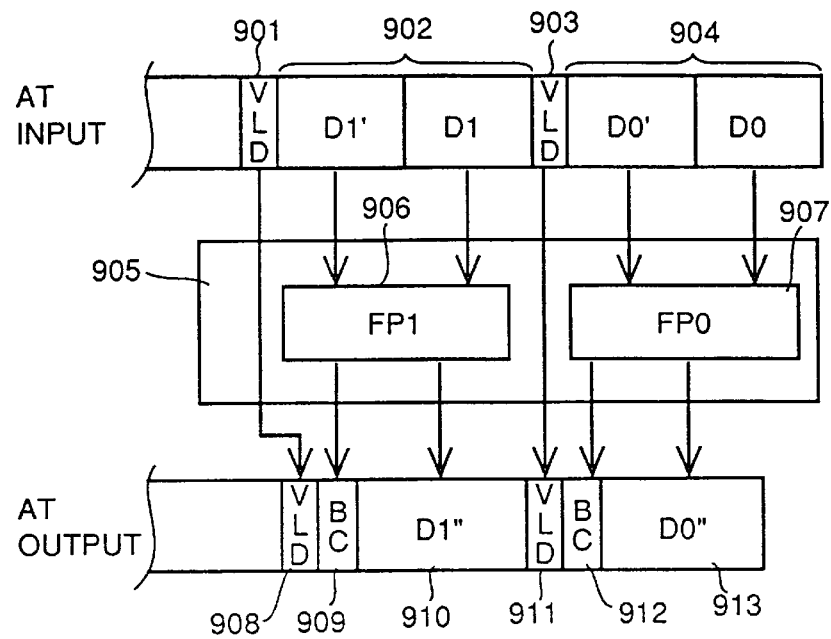
FIG. 9A is a diagram showing data packets input/output to/from the function processor.

FIG. 9A shows data packets input to the function processor and output therefrom. The input data packet includes the set of data D1' and D1 902 together with its flag VLD 901, the set of data D0' and D0 904 together with its flag VLD 903. The set of data D1' and D1 902 is input to FP1 906 in function processor portion 905. FP1 906 operates data D1' and D1, and stores the result in BC (Branch Condition) 909 and D1" 910. D1" 910 is set to the result of the numerical operation. Similarly, the set of data D0' and D0 904 is input to FP0 907, and BC 912 and D0" 913 are set to the result of condition determination and the result of numerical operation, respectively.

Function processor portion 905 changes the flags VLD 901 and VLD 903 of the input data packet to VLD 908 and VLD 911, respectively, and places them before BC 909 and BC 912, respectively. As a result, function processor portion 905 produces a data packet including VLD 908, BC 909, D1" 910, VLD 911, BC 912, and D0" 913, and outputs the packet to program storage portion 205.

Figure 9B:
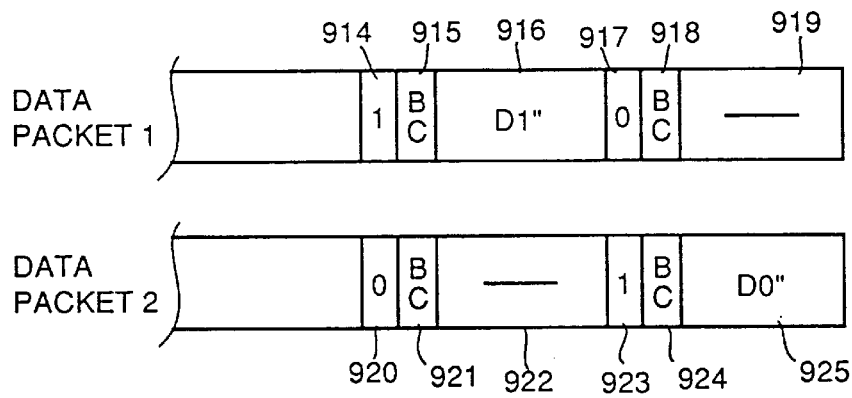
FIG. 9B is a diagram showing a data packet separated into two and output from the function processor.
Figure 9C:
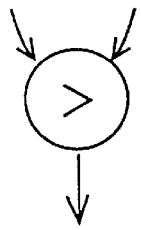
FIG. 9C shows a result of operation based on the magnitude.

FIG. 9C shows the result of operation based on the magnitude. Consider, for example, that an operation established provided that A (the left side data of data pair)>B (the right side data of data pair) is executed with FP1 906 and FP0 907. (The condition is established for (D1', D1)=(5, 1), while the condition is not established for (D0', D0)=(1, 6), and therefore BC 909 is set at 1, and BC 912 is set at 0. Since the results of condition determination BC 909 and BC 912 are different, different operations are executed on data D1" 910, and D0" 913 in some cases. In that case, D1" 910 and D0" 913 should be separated into different data packet.

FIG. 9B shows a data packet separated into two by the program storage portion. VLD 908, BC 909, and D1" 910 are stored as they are in data packet in VLD 914, BC 915, and D1" 916, and VLD 917 is set at 0. VLD 920 is set at 0, and VLD 911, BC 912 and D0" 913 are stored as they are in VLD 923, BC 924 and D0" 925 in data packet 2.

Thus, storing data with different instruction information and destination information in different data packets permits flexible processing within the data driven processor.

Figure 10A:
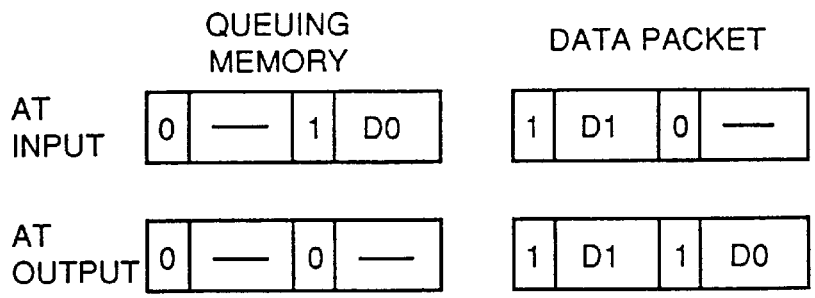
FIG. 10A is a diagram showing how two pieces of data having different generation numbers are successfully accommodated into the same data packet.

FIG. 10A is a diagram showing a data packet when two-generation-packeting is successful. If data D0 is present in the region of a hash address in the queuing memory and a data packet having identification information in coincidence with the hash address is input to firing control portion 203, since the data packet includes data D1, firing control portion 203 accommodates data D1 and D0 into one data packet for output. No data remains in the region of the hash address in the queuing memory as a result.

Figure 10B:
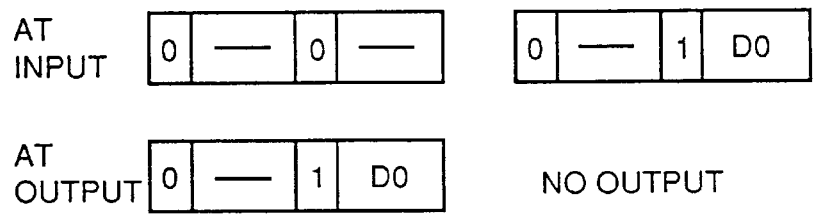
FIG. 10B is a diagram showing how two pieces of data having different generation numbers cannot be successfully accommodated into the same data packet.

FIG. 10B is a diagram showing a data packet when two-generation-packeting fails. If data is not present in the region of a hash address in the queuing memory and a data packet having identification information in coincidence with the hash address is input to firing control portion 203, firing control portion 203 does not produce a data packet, because corresponding data to be paired is not input even if data D0 is present in the data packet, and firing control portion 203 stores data D0 in the region of the hash address in the queuing memory and validates a corresponding flag.

Figure 11A:
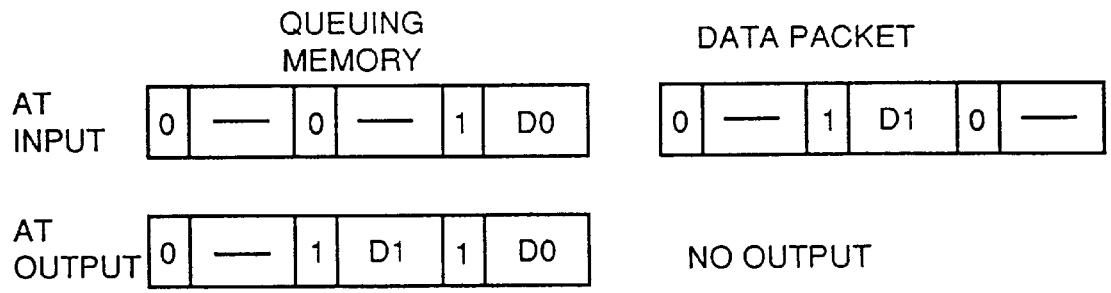
FIG. 11A is a diagram showing how three pieces of data having different generation numbers cannot be successfully accommodated into the same data packet.
Figure 11B:
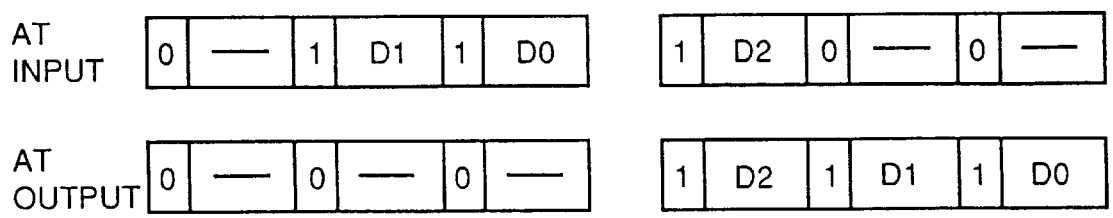
FIG. 11B is a diagram showing how three pieces of data having different generation numbers are successfully accommodated into the same data packet.

FIG. 11A is a diagram showing a data packet. when three-generation-packeting fails. If data D0 is present in the region of a hash address in the queuing memory and a data packet having identification information in coincidence with the hash address is input to firing control portion 203, three-generation-packeting cannot be achieved, because there are only two pieces of data input even with data D1 present in the data packet. Therefore, firing control portion 203 does not produce a data packet and stores data D1 in the region of a hash address and validates a corresponding flag.

Figure 1B:
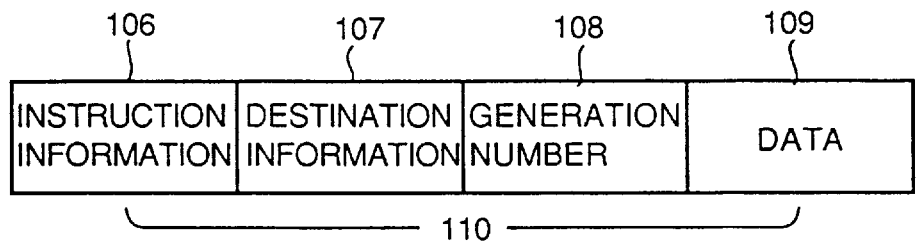
FIG. 1B is a diagram showing the arrangement of a data packet processed by the conventional data driven processor.

FIG. 1B is a diagram showing a data packet when three-generation-packeting is successful. If data D1 and D0 are present in the region of a hash address in the queuing memory and a data packet having identification information in coincidence with the hash address is input to firing control portion 203, since the data packet includes data D2, i.e., corresponding three pieces of data are present, thereby permitting three-generation-packeting. Firing control portion 203 stores data D2, D1 and D0 in one data packet for output. No data remains in the region Of the hash address in the queuing memory as a result.

As described above, if a data packet having one piece of data is subjected to multi-generation-packeting in a data driven processor, the speed of transfer and the speed of processing are increased in the data driven processor.

Figure 12:
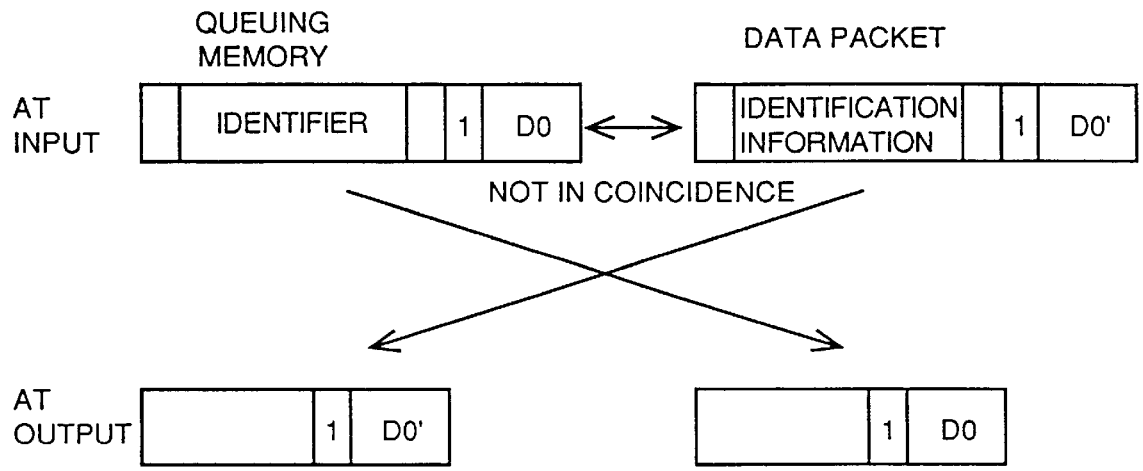
FIG. 12 shows the processing of validating a data packet input after if data packets with different identifiers are input.

FIG. 12 is a diagram showing the processing of validating a data packet which is input later among input data packets with different identifiers. Data D0 in the region of a hash address in the queuing memory queues for two-generation-packeting. At the time, a data packet including data D0' is input to firing control portion 203, and a hash address produced from identification information in the data packet coincides with the hash address in which data D0 is stored, firing control portion 203 compares the identifier of data D0 in the queuing memory and part of the identification information in the data packet. The identifier in the queuing memory is formed of part of a node number and a generation number which includes hash overflow. If the result of comparison indicates disagreement, data D0 in the queuing memory is stored in a data packet for output. Firing control portion 203 stores data D0' of the input data packet in the region of the hash address together with part of the identification information. Such disagreement is sometimes encountered if the node numbers disagree, or the generation numbers are not consecutive, and two-generation-packeting is not achieved. If two-generation-packeting is not possible, a data packet input later has priority. This approach is effective if a data packet input later has a higher possibility for two-generation-packeting.

Figure 13:
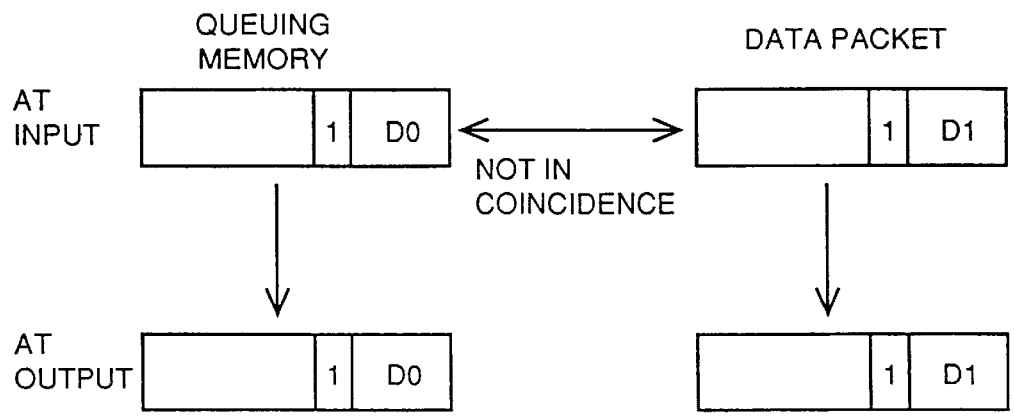
FIG. 13 shows the processing of validating a previously input data packet if data packets with different identifiers are input.

FIG. 13 shows the processing of validating a previously input data packet if data packets with different identifiers are input. Data D0 in the region of a hash address in the queuing memory queues for two-generation-packeting. At the time, if a data packet including data D1 is input to firing control portion 203 and a hash address produced from identification information in the data packet coincides with the hash address at which data D0 is stored, firing control portion 203 compares the identifier of data D0 in the queuing memory and part of the identification information in the data packet. If the result of comparison indicates disagreement, firing control portion 203 outputs the data packet including data D1 as it is. Therefore, D0 remains in the region of the hash address in the queuing memory. If two-generation-packeting cannot be achieved, a previously input data packet has priority. This approach is effective if a corresponding data packet in two-generation-packeting with a previously input data packet is inevitably input.

Figure 14:
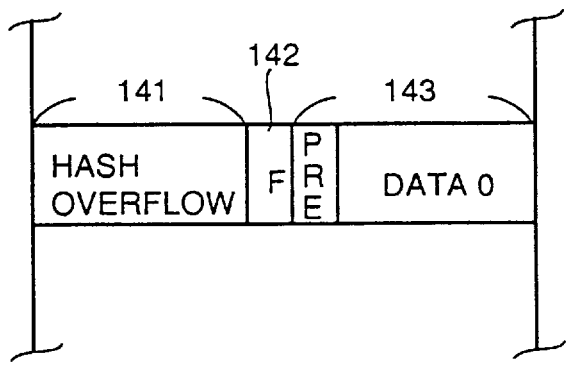
FIG. 14 is a diagram showing data including a two-generation-determination flag.

FIG. 14 shows data including a two-generation determination flag. If a hash overflow is encountered upon storing data 0 in the queuing memory, firing control portion 203 stores that hash overflow 141, flag PRE and data 0 143, together with two-generation-packeting valid/invalid flag F142. Two-generation-packeting valid/invalid flag F142 at 1 indicates the data stored in the queuing memory queues for two-generation-packeting, while F142 at 0 indicates queuing for data to be paired for operation. Attaching two-generation-packeting valid/invalid flag F142 to data permits use of the same region in the queuing memory for two purposes, in other words for queuing for two-generation-packeting and for queuing for data to be paired for operation.

Figure 15:
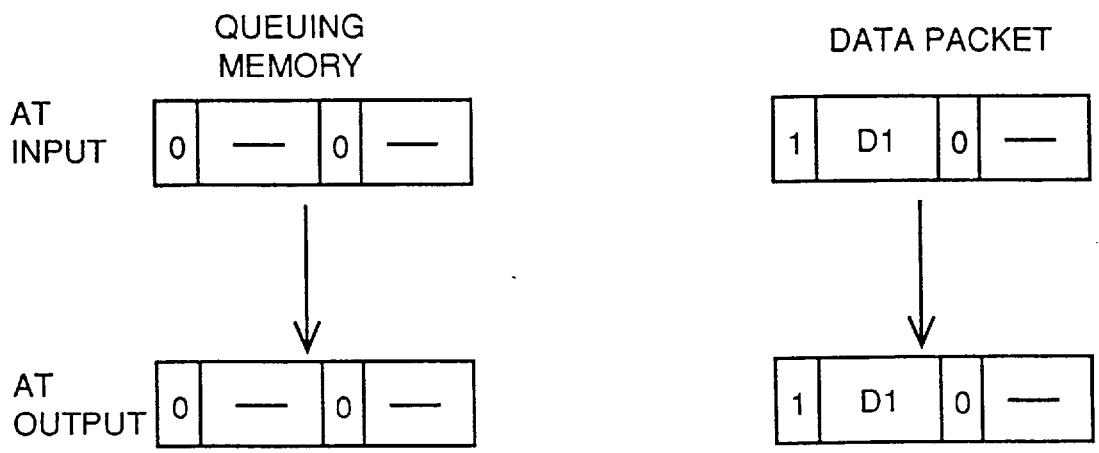
FIG. 15 is a diagram showing the case in which data is not stored in the queuing memory.

FIG. 15 shows the case in which data is not stored in the queuing memory. If no data is present in the region of a hash address in the queuing memory and a data packet having identification information in coincidence with the hash address is input to firing control portion 203, firing control portion 203 does not store the data D1 of the data packet in the queuing memory but directly outputs the data packet. This is the case in which the generation number in an input data packet is an odd number and data having an even generation number to be paired upon two-generation-packeting is not stored in the queuing memory. In two-generation-packeting, two pieces of data subjected to two-generation-packeting will have consecutive generation numbers, and the even generation number always has a smaller number. If a data packet having an odd generation number is input to firing control portion 203, and data having an even generation number to be paired upon two-generation-packeting is not present in the queuing memory, control portion 203 regards data having an even generation number as having already been output, and does not store data D1 in the queuing memory but directly output the data packet. If a data packet having one piece of data is subjected to two-generation-packeting, the queuing memory will not be occupied in a period longer than necessary.

Figure 16:
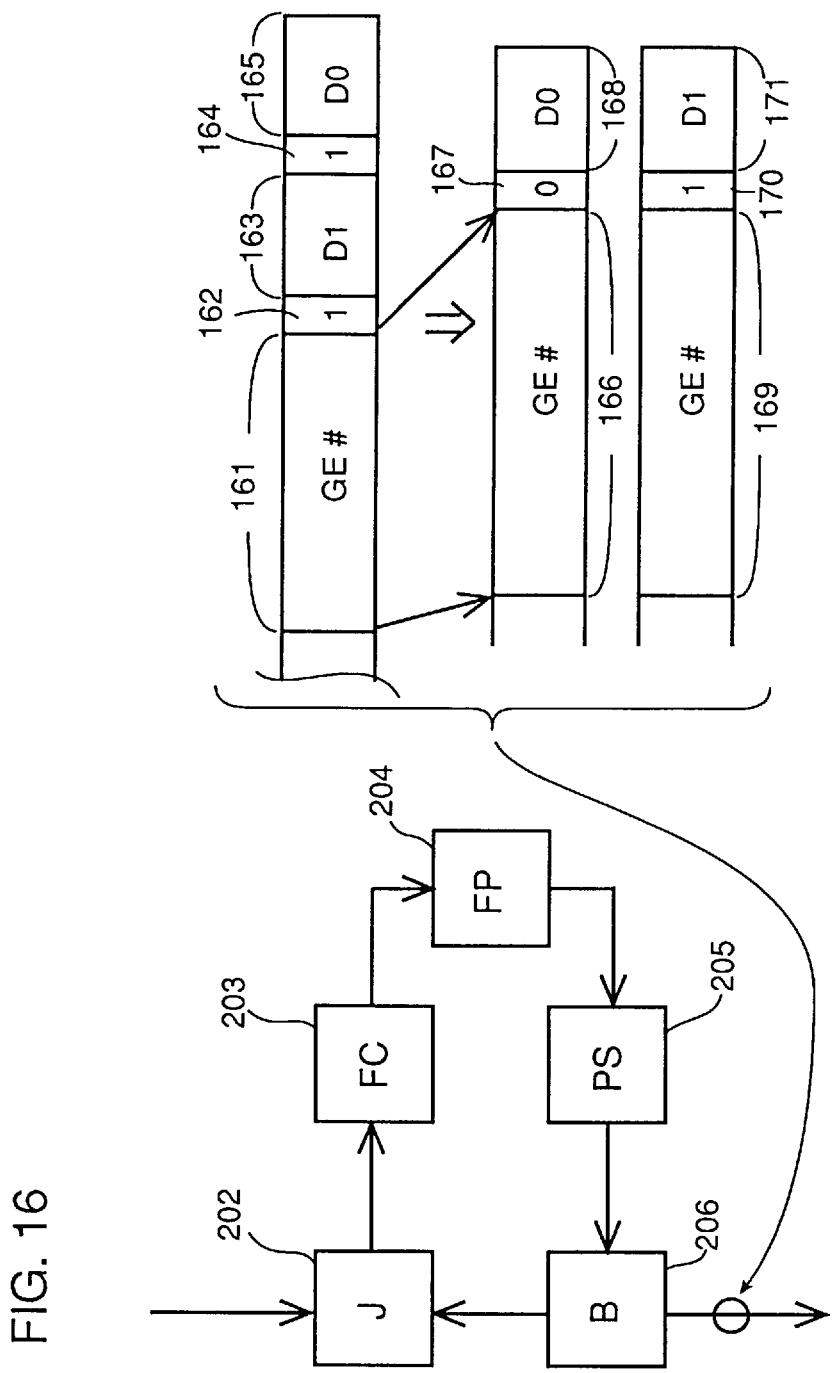
FIG. 16 is a diagram showing the case in which a data packet is separated at the branching portion.

FIG. 16 shows the case of seperating a data packet at branching portion 206. If a data packet subjected to two-generation-packeting is output from program storage portion 205 to branching portion 206, branching portion 206 must separate the data packet into two data packets for output upon if it determines that the data packet should be processed in another data driven processor. Branching portion 206 stores the generation number GE#161 of the two-generation-packeted data packet in GE#166 in order to produce a data packet including an even generation number (smaller generation number) and stores "0" 167 next to it. Data D0 165 is directly stored in D0 168 to produce a data packet including an even generation number. Note that the same instruction information and node number as the two-generation-packeted data packet are used.

Branching portion 206 directly stores the generation number GE#161 of the two-generation-packeted data packet in GE#169 in order to produce a data packet including an odd generation number from the two-generation-packetted data packet and then stores "1" 170 next to it. Data D1 163 is directly stored in D1 171 to produce a data packet including an odd generation number. Thus, a data driven processor capable of processing a data packet including a plurality of pieces of data and a data driven processor capable of processing a data packet including only one piece of data may be compatible with each other.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven information processor executing parallel processing, plurality of said data driven information processors being connected, comprising:

input control means for producing a first data packet having a plurality of pieces of data and common identification information including a generation field common to each of the plurality of pieces of data; and information processing means for detecting and processing data to be paired with data in said first data packet.

2. The data driven information processor as recited in claim 1, wherein said information processing means includes:

junction means for controlling input of said first data packet and a second data packet and outputting a selected one as a third packet;

firing control means for detecting data to be paired with data in said third data packet and outputting paired data;

operation processing means for operating said paired data;

program storage means for producing and outputting said second data packet based on a result of said operation; and branching means for controlling whether to output said second data packet to said junction means or to another data driven information processor.

3. The data driven information processor as recited in claim 1, wherein a plurality of pieces of data in said first data packet are correlated with each other.

4. The data driven information processor as recited in claim 2, wherein said identification information includes a generation number for identifying data to be paired, and said firing control means accommodates a plurality of pieces of data having consecutive generation numbers in a fourth data packet and makes a common portion between said consecutive generation numbers a generation number of said fourth data packet.

5. The data driven information processor as recited in claim 4, wherein said fourth data packet includes an identification flag indicating whether or not each piece of data is valid.

6. The data driven information processor as recited in claim 2, wherein
said operation processing means includes a plurality of operators.

7. The data driven information processor as recited in claim 2, wherein
said firing control means includes a queuing memory for queuing for said data to be paired, and stores, in said queuing memory, a hash overflow generated upon producing a hash address together with data.

8. The data driven information processor as recited in claim 2, wherein
said firing control means includes a queuing memory for queuing said data to be paired, determines whether data to be paired is present in said queuing memory for each of a plurality of pieces of data in said third data packet, and accommodates corresponding data as paired data in the fourth data packet for output.

9. The data driven information processor as recited in claim 8, wherein
said operation processing means includes a plurality of operators, and
said plurality of operators execute operation on a pieces of data in said fourth data packet respectively at a time, and accommodate a plurality of results of said operation in a fifth data packet.

10. The data driven information processor as recited in claim 9, wherein
said plurality of operation results each includes a condition determination result, and
said program storage means determines whether or not to separate said plurality of operation results into two data packets based on said plurality of condition determination results.

11. The data driven information processor as recited in claim 2, wherein
said firing control means includes a queuing memory for queuing for said data to be paired, and compares an identification flag indicating whether or not data attached to each of a plurality of pieces of data in said third data packet is valid with a corresponding identification flag in data having a same identification information as identification information of said third data packet stored in said queuing memory, and produces a fourth data packet based on the result of comparison.

12. The data driven information processor as recited in claim 11, wherein
if said comparison result is valid, corresponding data in said third packet and corresponding data in said queuing memory are paired and accommodated into said fourth data packet, a corresponding identification flag in the fourth data packet is validated, a corresponding identification flag in said queuing memory is invalidated,
if only a corresponding identification flag in said third data packet is valid based on the result of comparison, a corresponding identification flag in said fourth data packet is invalidated, corresponding data in said third data packet is stored in said queuing memory, a corresponding identification flag is validated, and a corresponding identification flag in the third data packet is invalidated,
if only a corresponding identification flag in said queuing memory is valid based on said comparison result, a corresponding identification flag in said fourth data packet is invalidated, and
if both flags are invalid based on said result of comparison, a corresponding identification flag in said fourth data packet is invalidated.

13. The data driven information processor as recited in claim 2, wherein
said firing control means includes a queuing memory for queuing for data for multi-generation-packeting, and
if said firing control means queues for invalid data among a plurality of pieces of data stored in said queuing memory and having same identification information and a data packet with said same identification information having valid data corresponding to said invalid data is input, said firing control means replaces said invalid data with said valid data, and accommodates said valid data in a fourth data packet for output.

14. The data driven information processor as recited in claim 2, wherein
said firing control means includes a queuing memory for queuing for data for multi-generation-packeting, and
said firing control means produces a hash address and a first identifier from identification information of said third data packet, accommodates corresponding data in said queuing memory in a fourth data packet if a second identifier in data in a region indicated by said hash address in said queuing memory does not coincide with said first identifier, and stores data in said third data packet in the region indicated by said hash address in said queuing memory.

15. The data driven information processor as recited in claim 2, wherein
said firing control means includes a queuing memory for queuing for data for multi-generation-packeting, and produces a hash address and a first identifier from identification information of said third data packet, and directly outputs said third data packet if a second identifier in data in a region indicated by said hash address in said queuing memory does not coincide with said first identifier.

16. The data driven information processor as recited inc claim 2, wherein
said firing control means includes a queuing memory for queuing for data, produces a hash address and a hash overflow from identification information of said third data packet, and stores in a region indicated by said hash address, said hash overflow, a flag indicating whether it is queuing for multi-generation-packeting or for data to be paired, and data included in said third data packet.

17. The data driven information processor as recited in claim 2, wherein
said firing control means includes a queuing memory for queuing for data for multi-generation-packeting, and outputs said third data packet if data to be paired with data in said third data packet in multi-generation-packeting is not stored in said queuing memory.

18. The data driven information processor as recited in claim 2, wherein
said branching means separates a data packet including a plurality of pieces of data produced by multi-generation-packeting into a plurality of data packets for output.

19. The data driven information processor as recited in claim 2, wherein
said firing control means includes a queuing memory for queuing for data for multi-generation packeting.

20. A method for executing parallel processing, comprising the steps of:

(a) producing a first data packet having a plurality of pieces of data and common identification information including a generation field common to each of the plurality of pieces of data; and (b) detecting and processing data to be paired with data in said first data packet.

21. The method as recited in claim 20, wherein step (b) includes:

(c) controlling input of said first data packet and a second data packet and outputting the selected one as a third packet;

(d) detecting data to be paired with data in said third data packet and outputting paired data;

(e) operating said paired data;

(f) producing and outputting said second data packet based on a result of said operation; and (g) controlling whether to output said second data packet to said step (c) or to another data driven information processor.

22. The method as recited in claim 21, wherein said identification information includes a generation number for identifying data to be paired, and step (d) accommodates a plurality of pieces of data having consecutive generation numbers in a fourth data packet and makes a common portion between said consecutive generation numbers, as a generation number of said fourth data packet.

23. The method as recited in claim 21, wherein step (d) includes determining whether data to be paired is present in a queuing memory, for queuing said data to be paired, for each of a plurality of pieces of data in said third data packet, and accommodating corresponding data as paired data in the fourth data packet for output.

24. The method as recited in claim 21, wherein step (d) includes producing a hash address and a hash overflow from identification information of said third data packet, and storing in a region indicated by said hash address, said hash overflow, a flag indicating whether step (d) is queuing for multi-generation-packeting or for data to be paired, and data included in said third data packet.

25. The method as recited in claim 21, wherein step (g) separates a data packet including a plurality of pieces of data produced by multi-generation-packeting into a plurality of data packets for output.

26. The method as recited in claim 21, wherein step (d) includes queuing for data for multi-generation-packeting with a queuing memory.

* * * * *